US009760900B2

(12) United States Patent
Sewak

(10) Patent No.: US 9,760,900 B2
(45) Date of Patent: Sep. 12, 2017

(54) TREND-FACTORED RFM SCORES TO IMPROVE CAMPAIGN PERFORMANCE

(71) Applicant: International Business Machines Corporation, Armonk, NY (US)

(72) Inventor: Mohit Sewak, Lucknow (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 13/962,371

(22) Filed: Aug. 8, 2013

(65) Prior Publication Data

US 2015/0046218 A1 Feb. 12, 2015

(51) Int. Cl.
*G06Q 30/02* (2012.01)
(52) U.S. Cl.
CPC ............... *G06Q 30/0202* (2013.01)
(58) Field of Classification Search
CPC .................................. G06Q 30/0202
USPC ....................................... 705/7.31
See application file for complete search history.

(56) References Cited

U.S. PATENT DOCUMENTS

| | | | |
|---|---|---|---|
| 7,280,974 B2 | 10/2007 | Blanchard et al. | |
| 2004/0122725 A1* | 6/2004 | Womack et al. | 705/10 |
| 2005/0015376 A1* | 1/2005 | Fraser et al. | 707/10 |
| 2005/0096950 A1* | 5/2005 | Caplan et al. | 705/7 |
| 2006/0020424 A1* | 1/2006 | Quindel | 702/183 |
| 2008/0027787 A1* | 1/2008 | Malsbenden et al. | 705/10 |
| 2008/0162268 A1* | 7/2008 | Gilbert | 705/10 |
| 2008/0205768 A1* | 8/2008 | Srivastava | 382/206 |
| 2009/0132347 A1 | 5/2009 | Anderson et al. | |
| 2009/0157476 A1 | 6/2009 | Itani et al. | |
| 2011/0258049 A1* | 10/2011 | Ramer et al. | 705/14.66 |

FOREIGN PATENT DOCUMENTS

| | | |
|---|---|---|
| WO | 2004083986 A2 | 9/2004 |
| WO | 2006065779 A2 | 6/2006 |

OTHER PUBLICATIONS

Consumers Price Index: Jun. 2011 quarter, Sep. 26, 2011, http://web.archive.org/web/20110926065104/http://www.stats.govt.nz/browse_for_stats/economic_indicators/CPI_inflation/ConsumersPriceIndex_HOTPJun11qtr/Technical%20Notes.aspx, p. 3).*

(Continued)

*Primary Examiner* — Beth V Boswell
*Assistant Examiner* — Joseph Waesco
(74) *Attorney, Agent, or Firm* — Daniel R. Simek

(57) ABSTRACT

A computer determines an RFM score for each of a plurality of contacts, each RFM score comprising a recency score, a frequency score and a monetary score respectively based on assigning recency values, frequency values, and monetary values of the plurality of contacts to groups. The computer generates trend factors, wherein the trend factors are based on the monetary values and timestamps of each of a plurality of transactions for each contact of the plurality of contacts. The computer generates a mean trend factor, based on the trend factors generated for each of the plurality of transactions for each contact of the plurality of contacts, and determines, by one or more processors, a trend adjusted RFM (tRFM) score based on applying the mean trend factor to at least one of the recency score, the frequency score, and the monetary score, for each contact of the plurality of contacts.

20 Claims, 4 Drawing Sheets

(56) References Cited

OTHER PUBLICATIONS

Consumer Price Index: Jun. 2011 quarter, Sep. 26, 2011, Statistics New Zealand, p. 1-10.*
Exponential Growth, Jun. 20, 2012, Wikipedia, p. 1-8.*
U.S. Appl. No. 14/492,273 entitled "Trend-Factored RFM Scores to Improve Campaign Performance", filed Sep. 22, 2014.
Chen et al. "Discovering recency, frequency, and monetary (RFM) sequential patterns from customers' purchasing data," Electronic Commerce Research and Applications 8 (2009) pp. 241-251, © 2009 Elsevier B.V. doi: 10.1016/j.elerap.2009.03.002.
"Campaign Optimization using RFM Analysis—Marketing Analyses—SAP Library," © 2013 SAP AG or an SAP affiliate company, date last accessed and printed May 15, 2013.

* cited by examiner

TREND-FACTORED RFM SCORES TO IMPROVE CAMPAIGN PERFORMANCE

BACKGROUND OF THE INVENTION

The present invention relates generally to the field of consumer behavior forecasting, and more particularly to improving the effectiveness of response to solicitations.

Marketing campaigns are used to focus sales or solicitation efforts and improve desired results. A marketing campaign uses organized activities to promote a product or a specific result through the use of different mediums, typically using various types of advertizing. Undirected advertizing can be ineffective, costly and wasteful, therefore campaigns benefit from efforts that identify distinguishable groups that are most likely to respond positively to marketing solicitations.

Commercial solicitations, whether for traditional sales, direct sales or for contributions, make use of marketing techniques to identify contact sets having higher probability of responding. All forms of marketing carry a cost-benefit ratio, and determining the appropriate target audience for the marketing campaign is essential to positive returns. Variations of the recency, frequency, and monetary value (RFM) model have been widely applied in many commercial and solicitation areas, particularly in direct marketing. Recency (R) refers to a measure of how recently a contact responded to a solicitation, such as making a purchase or responding to a solicitation for contributions by making a donation. Frequency refers to the total number of responses a contact has made within a designated time period, such as the number of distinct purchases made within the last six months, for example. Monetary value refers to the total value of purchases made (or donations made) within a designated time period.

By applying an RFM model, marketing campaign decision makers can more effectively identify contact sets that are more likely to respond and therefore improve the cost-benefit ration of marketing, as well as improve overall results. To apply an RFM model requires accumulating data associated with the activities of responders to sales or contribution solicitations. Although RFM models offer a means to identify targeted audiences, shortcomings exist that fail to distinguish differences in contact data.

BRIEF SUMMARY

Embodiments of the present invention disclose a method, computer program product, and system for including a trend factor in recency, frequency, and monetary (RFM) scores. A computer determines an RFM score for each of a plurality of contacts, each RFM score comprising a recency score, a frequency score and a monetary score respectively based on assigning recency values, frequency values, and monetary values of the plurality of contacts to groups. The computer generates trend factors, wherein the trend factors are based on the monetary values and timestamps of each of a plurality of transactions for each contact of the plurality of contacts. The computer generates a mean trend factor, based on the trend factors generated for each of the plurality of transactions for each contact of the plurality of contacts, and determines, by one or more processors, a trend adjusted RFM (tRFM) score based on applying the mean trend factor to at least one of the recency score, the frequency score, and the monetary score, for each contact of the plurality of contacts.

DETAILED DESCRIPTION

Figure 1:
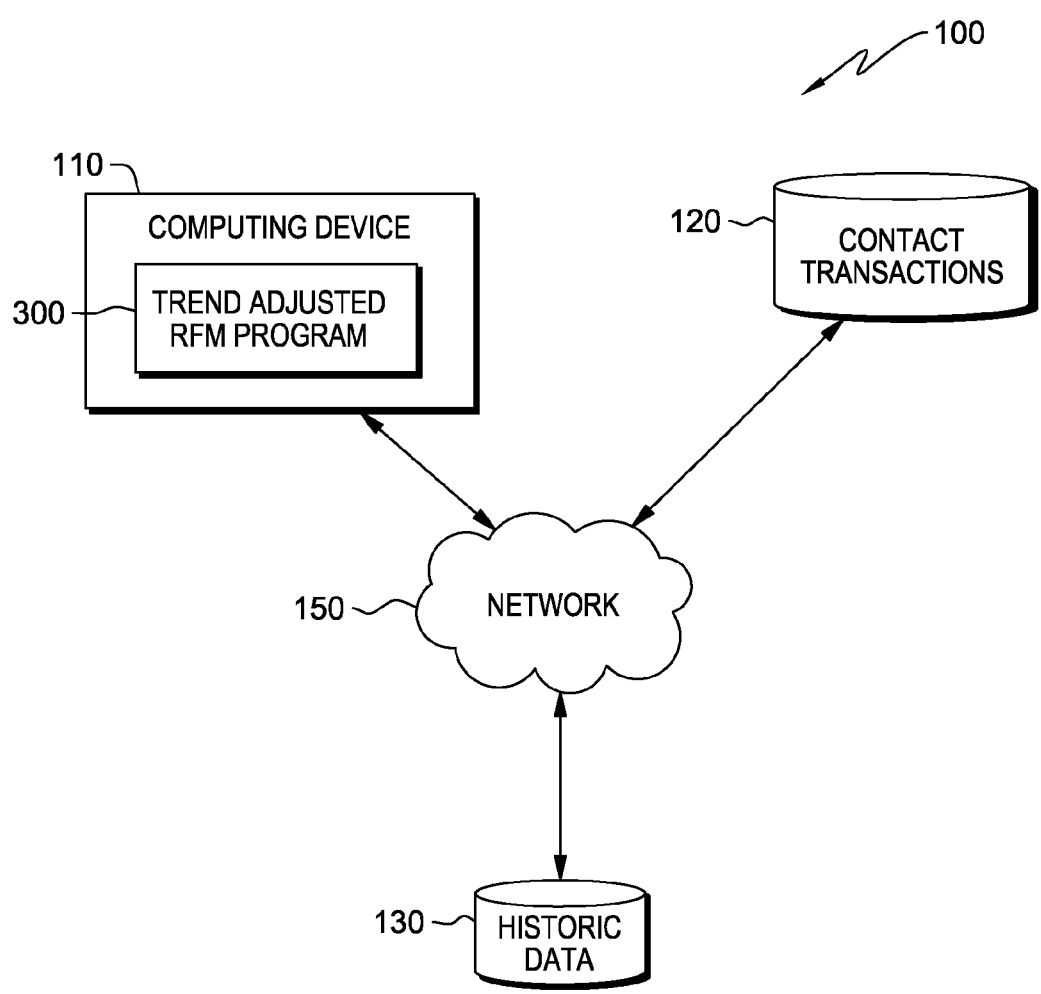
FIG. 1 is a functional block diagram illustrating a distributed data processing environment, in accordance with an embodiment of the present invention.

Embodiments of the present invention recognize that similar RFM scores may result from different and even diverging contact data. Contacts may be customers making purchases, donors making donations, or responders to other solicitation or advertising. For example, the two contacts may be customers that both make purchases each week and have a most-current purchase date of five days previous to the current date. Both customers may have spent the same monetary amount on purchases over the last six months ($2400, for example). Both customers have the same recency (five days ago), the same frequency (twenty four purchases in the last six months) and the same monetary value ($2400), expended during the six month time period. Based on the data, the RFM score for both customers is the same implying that both customers would have similar response rates to a sales campaign promoting products purchased by both customers.

However, further analysis of the customer data indicates that one customer has been gradually increasing the monetary value of purchases each week for the past six months, starting from a lower purchase level, while conversely, the other customer has been decreasing the amount of purchases each week over the past six months, starting from a higher purchasing level. The differing trends of the two customers clearly distinguishes them and including information of this type in RFM scoring improves the effectiveness of identifying audiences that are more likely to respond to a particular type of campaign or respond to a greater level to one type of campaign as compared to other types of campaigns. Similarly one customer may be more likely to purchase more whereas the other customer may be a risk of retention and a different campaign strategy may be more appropriate.

Embodiments of the present invention include a trend factor to apply to RFM scores to more effectively represent trend behavior in customer data as applied to campaigns or marketing audience selection and result in improved response rate of appropriately targeted contact audiences.

Implementation of such embodiments may take a variety forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention. Distributed data processing environment 100 includes computing device 110, contact transaction 120, and historic data 130, interconnected via network 150.

Network 150 can be, for example, a local area network (LAN), a wide area network (WAN) such as the Internet, or a combination of the two, and can include wired, wireless, or fiber optic connections. In general, network 150 can be any combination of connections and protocols that will support communications between computing device 110, contact transactions 120, historic data 130, and other devices.

Contact transactions 120 is a database containing data for a set of contacts that have made a transaction within distributed data processing environment 100. Transaction data within contact transactions 120 includes, but is not necessarily limited to, customer ID, timestamp of each transaction, the monetary amount of each transaction, and a calculated number of transactions per unit of time specified. The data from contact transactions 120 can be sorted in levels by data field, such as sorting all the data by contact, then sorting each contact's data by transaction timestamp, from the most recent transaction (response) to least recent. In one embodiment, contact transactions 120 resides on a tangible, persistent storage device of computing device 110, while in other embodiments, contact transactions 120 is stored on a tangible, persistent storage device remote to computing device 110, but accessible via network 150.

Data from contact transactions 120 is sorted and used to generate RFM scores for each contact. RFM scores are used to group contacts with similar RFM scores based on data that indicates a correlation indicating that contact groups with an RFM score within a certain range are more likely to respond to campaign activity than contact groups having different RFM scores.

Contacts are assigned RFM scores by sorting contact data to obtain the timestamp of transactions from most recent to least recent, the number of transactions, and the monetary value of each transaction, for a specified period of time.

Contacts are sorted by their recency, frequency and monetary values iteratively to assign them to various "bins" which are groupings with associated value ranges for each of the recency, frequency and monetary value data parameters. For example, each of recency, frequency and monetary value may be segmented into 5 groupings or "bins". The recency of transactions may assign contacts who have made a transaction in the last week to bin number 5; those who have made a most recent transaction between one and two weeks ago may be assigned to bin number 4; those making transactions between two and three weeks ago may be assigned to bin number 3, and so on.

Each recency bin is further segmented into 5 frequency bins, and contacts from each recency bin, for example bin 5, are further assigned to one of the 5 frequency bins, based on the total number of transactions in the specified period. Contacts with the higher number of transactions are assigned to bin number 5 and contacts with progressively fewer transactions are respectively assigned to bins 4, 3, 2, and 1.

Contacts in each frequency bin are further assigned to a monetary value bin. Similar to the assignment of the other bins, contacts having the highest level of monetary value for the period specified, are assigned to bin number 5. Contacts with the next level of monetary values are assigned to bin 4, and so on. In one embodiment of the present invention, the parameter ranges for each bin are chosen to achieve or at least approximate an equal distribution of contacts in each bin, in another embodiment, bin ranges are specifically chosen based on other campaign related information regardless of the resulting distribution of contacts assigned to bins.

Typically, 5 bins for each of recency, frequency and monetary value, are used to derive RFM scores, sometimes referred to as quintiles, however, other choices of the number of bins to use can be effective. Having assigned contacts to three tiers of numbered bins, contacts are grouped by the bin number for each of the RFM parameters, for example, one group may be in recency bin number 5, frequency bin number 2 and monetary value bin number 4. In one embodiment, a weight is given to each of recency, frequency and monetary value. Typically this would be represented by: recency bin number×100, frequency bin number×10 and monetary value bin number×1. The weighted numbers would be summed so that for contacts in bin 5 for each of recency, frequency and monetary value parameters, the RFM score would be: (5×100)+(5×10)+(5×1) producing an RFM score of 555. In another embodiment, RFM scores are evenly weighted and the evenly weighted bin numbers for recency, frequency, and monetary value are summed, for example: 5×1+5×1+5×1=15.

Historic data 130 is a database that includes data associated with contacts that were included in previous campaign activities or solicitations. Historic data 130 includes data identifying the contact, response activity or transactions of the contact, and the value of the transaction or response activity. Historic data 130 may also include a subject or description associated with the campaign intent or objectives. Historic data 130 may be used to determine weights to be applied to values of recency, frequency, and monetary value, to improve effectiveness of RFM scores.

Computing device 110 may be a desktop computer, laptop computer, a specialized computer server, a client computer, tablet, or netbook personal computer (PC), a personal digital assistant (PDA), a smart phone, a mainframe computer, or a networked server computer. Further, computing device 110 can represent computing systems utilizing clustered computers and components to act as single pools of seamless resources when accessed through network 150, as is common in data centers and with cloud computing applications. In general, computing device 110 is representative of any programmable electronic device or combination of programmable electronic devices capable of executing machine-readable program instructions. Computing device 110 may include internal and external hardware components, as depicted and described in further detail with respect to FIG. 4.

Computing device 110 includes trend adjusted RFM program 300, which uses data from contact transactions 120 to generate trend factors for each transaction, and uses the trend factors to calculate a mean trend factor. Each trend factor and mean trend factor are associated with a specific contact and are applied to traditional RFM scores that are generated for particular campaign activities, to further distinguish contacts by the trend of transactions. Applying a mean trend factor to RFM scores includes representation of transaction trends for the period of time considered.

Figure 2:
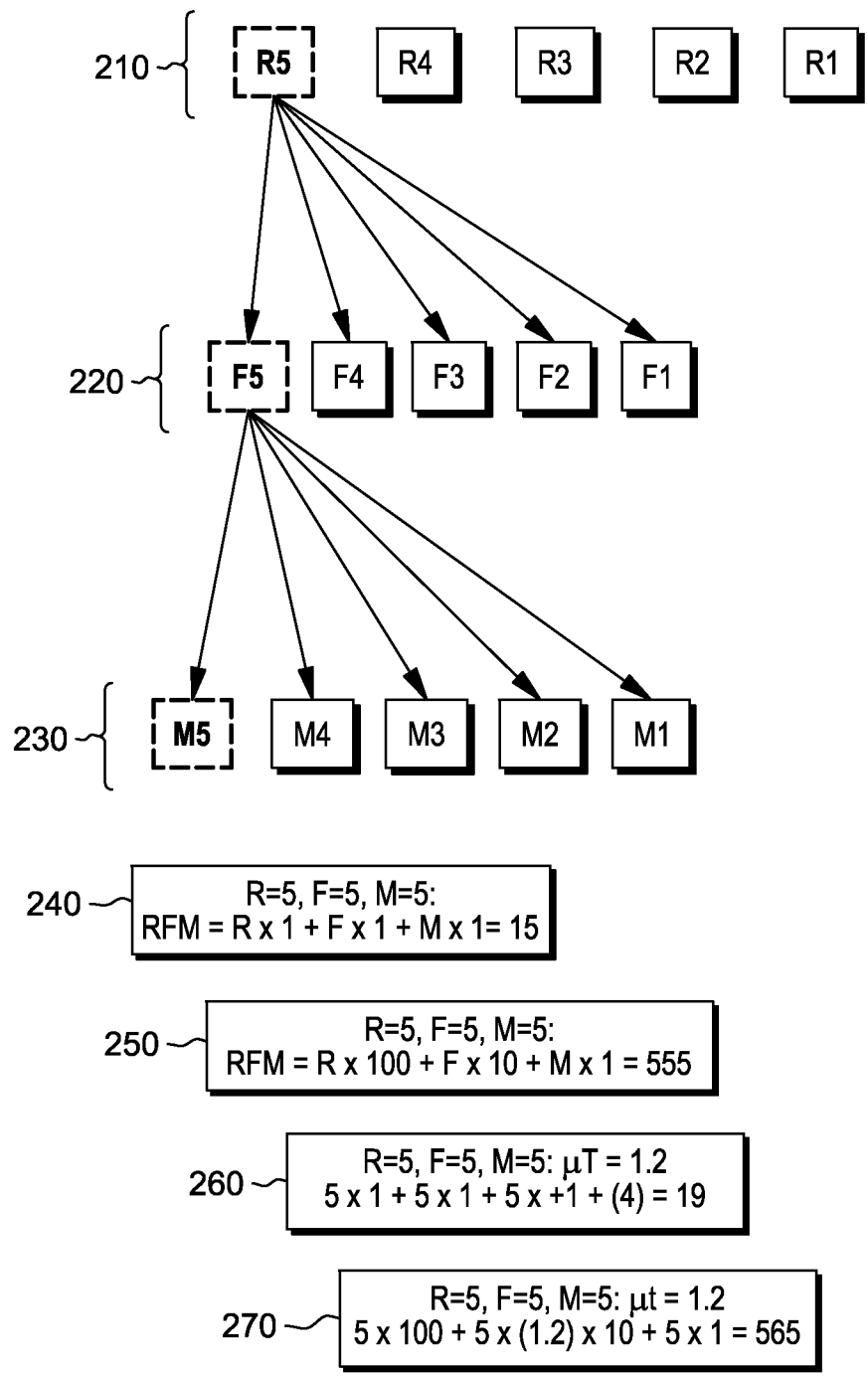
FIG. 2 illustrates exemplary RFM bin organization and RFM score determination, in accordance with an embodiment of the present invention.

FIG. 2 illustrates exemplary segmentation and RFM score determination, in accordance with an embodiment of the present invention. RFM scores are used to segment a population of contacts, which may be customers or donors, so that the portion of contacts most likely to respond is targeted. Contacts are sorted in a descending order presenting the "best value" first, followed by the "next-best-value", and so on. The contact data for recency, frequency, and monetary value are sorted such that the most recent response is the best value for recency, the highest amount of responses in a defined time period is the best frequency value, and the largest amount of either purchase or donation within the same defined time period is the best value for monetary value.

In one embodiment of the present invention, RFM scores are determined by sorting contacts into five groups or bins, for each of recency, frequency, and monetary value, and each group or bin contains similar numbers of contacts, each of the five bins referred to as quintiles. Embodiments of the present invention also apply to segmenting contacts into groupings of other than quintiles and may apply to segmented groups that do not contain similar numbers of contacts. Recency bins 210 are depicted as bins R5, R4, R3, R2, and R1. Recency bins 210 include a set of contacts' identities, hereafter referred to as "contacts", considered for a defined time period. Each bin includes contacts having similar recent response timestamps. R5 includes the contacts with the most recent responses; R4 represents the next most recent range of responses, and so on. RFM contact data is sorted initially by recency timestamp, next sorted by frequency, followed by monetary value sorting, however, embodiments of the present invention apply to other orders of contact data sorting as well. All contacts assigned to a recency bin are associated with the value of the recency bin. The contacts associated with recency bin R5 have a recency value of 5; R4 contacts are have a recency value of 4 and so on, with R1 contacts having a recency value of 1.

Recency bins 210 depict bin R5 as further segmented into frequency bins 220. Contacts of each bin of recency bins 210, are sorted by frequency value into one of five frequency bins 220, labeled F5, F4, F3, F2, and F1. The contacts having the highest frequency values are grouped into bin F5 of frequency bins 220, and have a frequency value of "5". The contacts having the next highest frequency values are grouped into bin F4, and receive a frequency value of "4", and so on. Similarly, the contacts in bins F3, F2, and F1 of frequency bins 220 have respective frequency values of "3", "2", and "1".

Continuing with the exemplary illustration of RFM sorting of contacts, the contacts within each bin of frequency bins 220 is further sorted into one of five monetary value bins 230, represented by M5, M4, M3, M2, and M1. Contacts having the highest monetary values for the defined time period are included in bin M5 of monetary value bins 230, and have a monetary value of "5". The contacts having the next highest monetary values are included in bin M4, and have a monetary value of "4", and so on. Having completed three levels of sorting, an RFM score can be generated for each contact by using the recency, frequency and monetary values of each bin to which the contact is associated.

RFM scores may be generated by using different methodologies. One way in which RFM scores are generated is by applying an equal weight to each of the recency scores, frequency scores, and monetary value scores associated with each bin, and summing the individual scores to produce an RFM score. For example, the contacts in bin R5 of recency bins 210 are assigned a recency score of "5". Of those contacts in bin R5, some are sorted into frequency bin F5 of frequency bins 220, and assigned a frequency score of "5". The contacts of bin F5 are sorted by monetary value and some are assigned to bin 5 of monetary value bins 230, receiving a monetary value score of "5". The contacts of bin M5 have recency score 5, frequency score 5 and monetary value score 5, as depicted in equal weight RFM score 240. As illustrated, the individual RFM values can be summed to produce an RFM score of 15. Equal weight RFM scores from other bins will have RFM scores ranging from 3 to 14.

Another method to generate an RFM score is by applying different weights to the recency, frequency and monetary value scores. This is done to further segment contact populations and may make use of the strength of each correlation of recency, frequency and monetary value to contact response. For example, weighted RFM score 250 depicts an RFM group or bin having a recency score of 5, a frequency score of 5 and a monetary value score of 5. The example assigns a weight of 100 to the recency score, a weight of 10 to the frequency score and a weight of 1 to the monetary score, resulting in equation (1).

$$(R \times 100)+(F \times 10)+(M \times 1)=(5 \times 100)+(5 \times 10)+(5 \times 1)=555 \quad (1)$$

This method produces 125 bins with RFM scores ranging from 111 to 555, in which the higher the score, the higher the probability of a contact responding to solicitation. In other exemplary embodiments, different weights may be applied, or given weights applied differently to the recency, frequency and monetary value scores. Weights and scores may be alternatively assigned to recency, frequency and monetary value, such that the lower the RFM score, the higher the probability of a contact responding to solicitation, as long as weighting, scores and interpretation are done consistently.

As previously stated embodiments of the present invention recognize that similar RFM scores may result from different and even diverging contact data. Including information regarding the trend of contact behavior relative to RFM scoring improves the effectiveness of identifying contact audiences that are more likely to respond to campaign solicitations. Embodiments of the present invention include a trend factor to apply to RFM scores to more effectively represent the trend of customer or donor behavior as it applies to campaign or marketing audience selection.

Equal-weighted trend RFM score 260 depicts a mean trend ($\mu$t) factor used to generate a trend adjusted RFM score (tRFM) for equal weights given to the recency, frequency, and monetary value bins. In one embodiment, the mean trend factor is the statistical average of the trend factors for each transaction of a contact within the defined time period being considered. Each trend factor is obtained from the ratio of a current transaction monetary value to the previous transaction monetary value, beginning with the most recent transaction. A trend factor is determined for each transaction of a contact, with the last transaction assigned a trend factor value, such as the value 1, to avoid dividing by zero. The statistical average of all the trend factors for the transactions of a contact is the mean trend factor. In other embodiments, the mean trend factor may be substituted by a median value or the mode value of the generated trend factors for the transactions of a contact.

For equal-weighted RFM bins, the mean trend factor is applied to the generation of an RFM score by creating a trend factor bin and assigning contact identities to bins based on the mean trend factor value determined for each contact. The trend factor bin score (5 through 1), to which a contact is assigned, is added to the sum of recency, frequency and monetary value scores to generate a trend adjusted RFM (tRFM) score. Equal-weighted trend RFM score 260 shows recency, frequency and monetary value scores of 5, for example, which would result in an RFM score of 15. In the example, the same contact produces a mean trend factor of 1.2, which is assigned a trend bin value (T) of 4, out of a 1 to 5 range of trend bin values. The resulting trend adjusted RFM score is shown by equation (2) to be adjusted to an overall RFM score of 19.

$$(5 \times 1)+(5 \times 1)+(5 \times 1)+(4 \times 1)=19$$

$$(R)+(F)+(N)+T=(\text{tRFM}). \quad (2)$$

The mean trend factor reflects a positive trend in monetary value over the time period being considered. Adding the mean trend factor bin value of "4" to the R, F, and M scores, respectively, results in the tRFM score of 19 out of a possible score of 20, and aligns with contacts that are among those likely to respond.

In embodiments using the mean trend factor with weighted RFM scores, the mean trend factor is multiplied with one of the recency, frequency or monetary value scores to adjust the weighted RFM score. As illustrated by weighted trend RFM score 270, recency, frequency and monetary value are given different weights. In an exemplary embodiment, weighted trend RFM score 270 depicts recency given a weight of 100, frequency a weight of 10, and monetary value a weight of 1. The mean trend factor is multiplied with whichever of the recency, frequency or monetary bin value that is the most relevant and has the strongest correlation with historic responses of similar campaigns. In cases lacking historic responses of similar campaigns, the mean trend factor is multiplied with the bin value that is given the median of weighted values. Weighted trend RFM score 270 gives the median weight of 10, from weights of 100, 10, and 1, to the frequency bin score. Lacking historic response correlation data of similar campaigns, the mean trend factor is multiplied with the frequency bin score.

In alternative embodiments of the present invention, a time interval weighted mean trend factor is used to provide the steepness or rate of trend over the defined time period. The weighted mean trend factor (w$\mu$T) is obtained by generating the ratio of the summation of the product of the trend value, as described above, and the reciprocal of the time period between transactions, for each transaction of a contact, to the reciprocal of the time period between transactions. The calculation is shown in equation (3), $$w\mu T=[t_1*(1/(P_1-P_2))+t_2*(1/(P_2-P_3))+ \ldots +1/1]/[(1/(P_1-P_2))+(1/(P_2-P_3))+ \ldots +(1/1)] \quad (3)$$

where $T_1$ is the trend factor for the most recent transaction of a particular contact, $T_2$ is the trend factor for the second most recent transaction of the particular contact, and so on. $P_1-P_2$ is the difference between the most recent transaction timestamp ($P_1$) and the next most recent transaction timestamp ($P_2$), in appropriate time units. For the least recent transaction of the particular contact, the value 1 is used for the denominator. The time interval weighted mean trend factor, hereafter referred to as the "weighted mean trend factor", is determined for each contact, and used in place of the (simple) mean trend factor for determining the trend adjusted RFM scores, as described above.

In another embodiment of the present invention, the mean trend factor for each contact of the plurality of contacts may be determined by plotting the generated trend factors for each transaction of a contact as a function of the transaction timestamps, from least recent to most recent, and summing a best fit calculated slope of the plot and the value 1.

Figure 3:
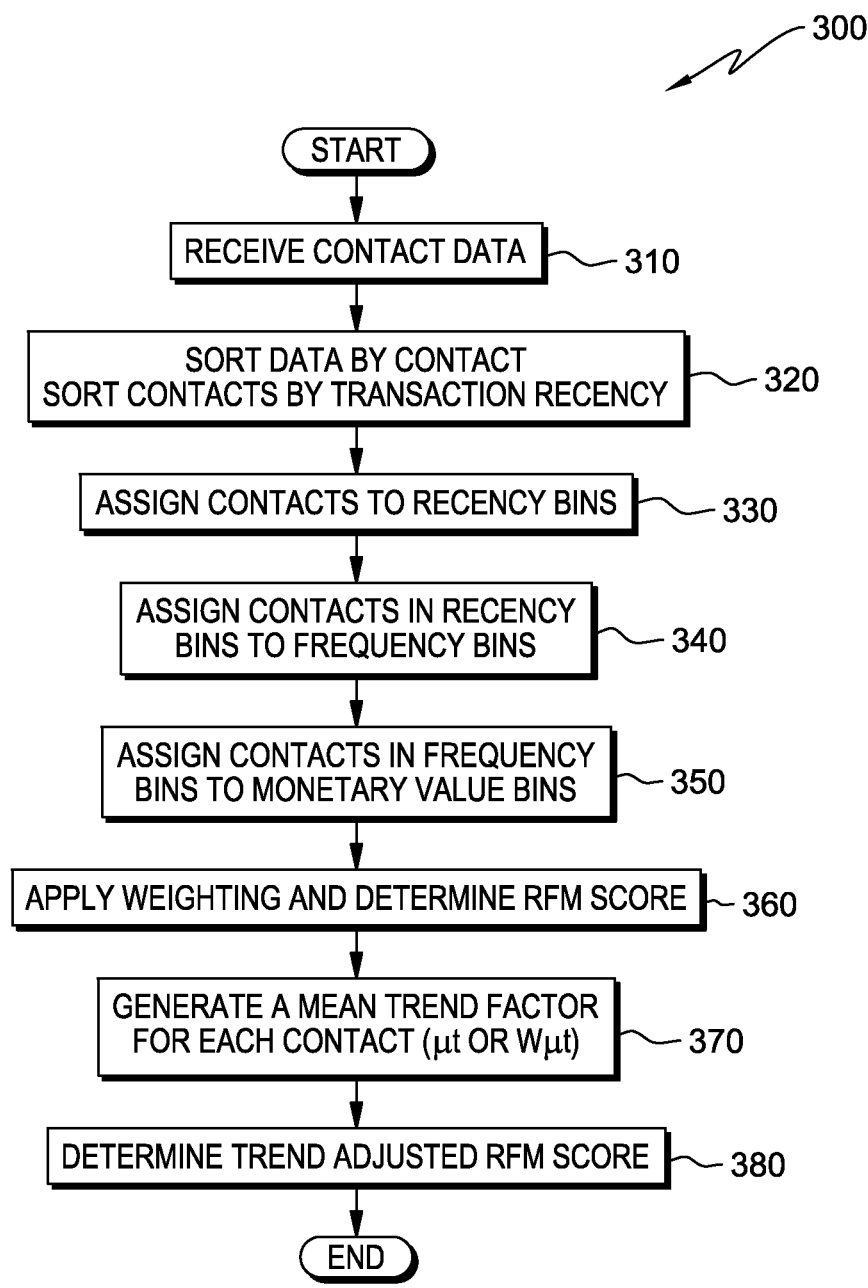
FIG. 3 illustrates operational steps of a trend adjusted RFM program, operating on a computing device within the data processing environment of FIG. 1, in accordance with an embodiment of the present invention.

FIG. 3 illustrates operational steps of a trend adjusted RFM program, operating on a computing device within the data processing environment of FIG. 1, in accordance with an embodiment of the present invention. Trend adjusted RFM program 300 resides on computing device 110 and uses contact transaction data to determine RFM scores for each of multiple contacts. In addition, trend adjusted RFM program 300 uses contact transaction data to generate a mean trend factor that when applied to a the RFM score of a contact results in a trend adjusted RFM score.

Trend adjusted RFM program 300 receives contact data (step 310). In one embodiment of the present invention, the contact data resides in contact transactions 120 (FIG. 1), which is a database accessible to trend adjusted RFM program 300, in other embodiments, contact data may reside in one or more locations and is sent to trend adjusted RFM program 300 in response to requests, or accessed by trend adjusted RFM program 300 from each of one or more data storage locations. The contact data includes, at least in part, transaction information identifying the contact, the timestamp of each transaction, and the transaction value. For example, trend adjusted RFM program 300 sends a request for contact data for a six month time period, to contact transactions 120. Contact transactions 120 responds by sending the transaction information for all contacts for the six month period specified, to trend adjusted RFM program 300, residing on computing device 110, via network 150.

Trend adjusted RFM program 300 sorts the transaction data by contact, and sorts each contact's data by transaction recency (step 320). For example, trend adjusted RFM program 300 receives contact data from contact transactions 120, and sorts the data by contact. Trend adjusted RFM program 300 further sorts each contact's data by transaction recency, sorting from the most recent transaction to the least recent transaction, for each contact.

Using the transaction recency data, trend adjusted RFM program 300 uses groupings or "bins" to group contacts with similar transaction recency. Trend adjusted RFM program 300 determines the number of bins to be used and assigns contacts to recency bins (step 330). In one embodiment of the present invention, trend adjusted RFM program 300 receives input for the number of bins to be used from user input, in other embodiments a default number of bins may be used. RFM scores are frequently determined from use of five or ten bins for each of recency, frequency, and monetary value contact data elements, depending upon the amount of segmentation desired. Values, such as 5, 4, 3, 2, and 1, are given to each of the bins, and each contact assigned to a bin is associated with the bin value. Contacts with the most recent transaction timestamp are assigned to the recency bin with the highest value, such as the bin with the value 5, for five-bin segmentation. Contacts with the next most recent transactions are assigned to bin 4 and so on, until all contacts are assigned to recency bins.

For example, trend adjusted RFM program 300 uses five bins for segmenting contacts by transaction recency. For the period of time being considered for the RFM scoring, trend adjusted RFM program 300 assigns contacts with the most recent transactions to bin 5, and assigns contacts with the next most recent transactions to bin 4 and so on until the contacts with the least recent transactions are assigned to recency bin 1.

Trend adjusted RFM program 300 assigns contacts in each recency bin to a frequency bin (step 340). Contacts that have been assigned to a recency bin, such as bin 5, are further assigned to a frequency bin, based on the total number of transactions made by the contact during the designated period of time being considered for the RFM scoring. Trend adjusted RFM program 300 uses the sorted contact data to determine the transaction frequency number for each contact. The number of frequency bins used matches the choice of the number of bins used for transaction recency. The frequency bins are given values, for example 5, 4, 3, 2, and 1, if five bins are being used for segmentation, and the contacts with the highest frequency of transactions are assigned to the bin with the highest value (5).

For example, the contacts assigned to bin 5 based on transaction recency, are assigned by trend adjusted RFM program 300 to one of five bins for frequency. The contacts having the highest number of transactions are assigned to bin 5, and the contacts with the next highest number of transactions are assigned to bin 4, and so on. In one embodiment, the range of values for bins is determined by trend adjusted RFM program 300 so that each bin includes similar numbers of contacts. In other embodiments, the range of values is specifically set and the number of contacts assigned to each bin may vary. Each contact assigned to recency bin 5 is now assigned to one of five frequency bins, and trend adjusted RFM program 300 assigns contacts from the other recency bins to an appropriate frequency bin, based on contact transaction data.

Trend adjusted RFM program 300 assigns each contact in a frequency bin to a monetary value bin (step 350). Contacts that have been assigned to a frequency bin, for example, frequency bin 5, are assigned to a monetary value bin, based on the monetary value of the transactions made by the contact during the designated period of time being considered for the RFM scoring. In one embodiment, the monetary value of the most recent transaction is used to determine the appropriate monetary bin to which the contact is assigned, on other embodiments the overall monetary value for the designated time period is used to assign the contact to a monetary bin. In yet other embodiments of the present invention, different representations of the monetary value of transactions for a contact in appropriate time units may be used to assign a contact to a monetary bin. The same number of bins is used for assigning contacts from each frequency bin to a monetary value bin, and the contacts with the highest transaction values are assigned to the bin with the highest value.

For example, the contacts assigned to frequency bin 5 based on the number of transactions are assigned by trend adjusted RFM program 300 to one of five bins for monetary value. The contacts having the highest value for the most recent transaction are assigned to bin 5, and the contacts with the next highest value of the most recent transaction are assigned to bin 4, and so on, until all contacts from frequency bin 5 are assigned to one of the five monetary value bins.

Having assigned all contacts to a recency, frequency and monetary value bin, with all bins assigned a corresponding value, RFM scores can be determined for all contacts. Trend adjusted RFM program 300 applies weighting and determines an RFM score for each contact (step 360). Each bin for recency, frequency, and monetary value is assigned a value, and the value of each bin is associated with the respectively assigned contacts. Each contact assigned to a recency bin, frequency bin, and monetary value bin, has three corresponding values that combine to form an RFM score of the contact. However, RFM scores include adding equal or unequal weights to the values for recency, frequency and monetary value. If equal weights are given to contact values for recency, frequency and monetary value, a weighted value of 1 can be assumed and the RFM score determined by adding the values for each of recency, frequency and monetary value. For a contact in recency bin 5, frequency bin 5 and monetary value bin 5, the equal weighted RFM score is 15 (5×1+5×1+5×1).

Unequal weights are similarly multiplied by the bin value and the result for each bin summed to obtain the RFM score. For example, for a contact assigned to recency bin 5, frequency bin 5 and monetary value bin 5, the recency bin value may be given a weight of 100, and the frequency bin value given a weight of 10 and the monetary value bin given a value of 1. The RFM score would be determined by summing the product of each bin value and the corresponding weight. In this example the recency bin is 5×100, the frequency bin is 5×10 and the monetary value bin is 5×1, which sums to 555 for an RFM score.

Trend adjusted RFM program 300 generates a mean trend factor for each contact (step 370). Trend adjusted RFM program 300 uses the sorted transaction data for each contact and generates a trend factor for each transaction by a ratio of the most recent transaction value to the previous most recent transaction value. The ratio for the least recent transaction value uses 1 as the denominator. In one embodiment of the present invention, a mean trend factor is generated for all contacts using a statistical average of all transaction trend factors for each contact.

For example, trend adjusted RFM program 300 generates trend factors for five transactions made by a contact within a designated period of time being considered for RFM scoring. Each trend factor is generated by taking the value of a ratio of the most recent transaction value to the next most recent transaction value, with the least recent transaction using the value 1 as the denominator of the ratio. The mean trend factor is generated from the statistical average of all the individual trend factors for the contact during the designated period of time.

In another embodiment of the present invention, a time interval weighted mean trend factor (w$\mu$T) is generated. The time interval weighted mean trend factor, hereafter referred to as the "weighted mean trend" factor, may be used as an alternative trend factor in generating trend adjusted RFM (tRFM) scores. The weighted mean trend factor accounts for the steepness of the response behavior trend of a contact. The weighted mean trend factor is calculated by a quotient of, the sum of the product of each trend factor and the reciprocal of the duration of time from the most recent transaction to the next most recent transaction, and the reciprocal of the duration time between the most recent and next most recent transactions, (see equation (3)). For the least recent transaction, the duration time is replaced with the value of 1.

Trend adjusted RFM program 300 determines the trend adjusted RFM score for each contact (step 380). For equal weighted RFM scores, the mean trend factors, or alternatively the weighted mean trend factors, are considered as an additional bin, and the trend factor is added to the RFM score, resulting in a tRFM score. The addition of the trend factor adjusts the contact's RFM score, based on trend information, relative to other contacts' scores. For example, a contact with a mean trend factor ($\mu$T) of 1.4 and RFM score of R=5+F=4+M=3, would be adjusted from 12, to 13.4, and in one embodiment, rounded to a score of 14.

For unequal or differential weighted RFM scores, trend adjusted RFM program 300 the mean trend factor or weighted mean trend factor is applied as a multiple to one of the recency, frequency or monetary value factors that has the highest correlation with responses from similar campaigns in the past. Lacking historic response data, the default practice is to apply the mean trend factor to the RFM value with the median weight. In the case of applying weights of 100, 10 and 1 to values for recency, frequency and monetary value, respectively, the mean trend factor is applied as a product of the median weight of 10, and the resulting tRFM score is obtained from equation (4):

$$(R\times100)+(F\times10\times\mu T)+(M\times1)=\text{tRFM} \quad (4)$$

For example, a tRFM score is generated for a contact having a recency bin value of 5, a frequency bin value of 4 and a monetary value bin value of 3 and a mean trend factor of 0.825. There is no previous similar campaign response data to indicate which bin produces the best response results when the mean trend factor is applied. The weighted tRFM score uses weights of 100 for recency, 10 for frequency and 1 for monetary value, and the mean trend factor (or weighted meant trend factor) is applied to the frequency bin value because the median of the weights (10) is applied to the frequency bin. The tRFM score is generated using the expression (R×100)+(F×10×$\mu$T)+(M×1), and inserting the contact values for each bin produces: (5×100)+(4×10× 0.825)+(3×1)=tRFM. Evaluating the expression gives the tRFM score of 536 instead of the non-trend-adjusted score of 543.

A tRFM score is generated for each contact and the resulting scores can then be used to more effectively choose contacts for promotion or retention campaigns, or determine actions and strategies that more effectively apply to groups of contacts. Having generated tRFM scores for contacts, trend adjusted RFM program 300 ends.

Figure 4:
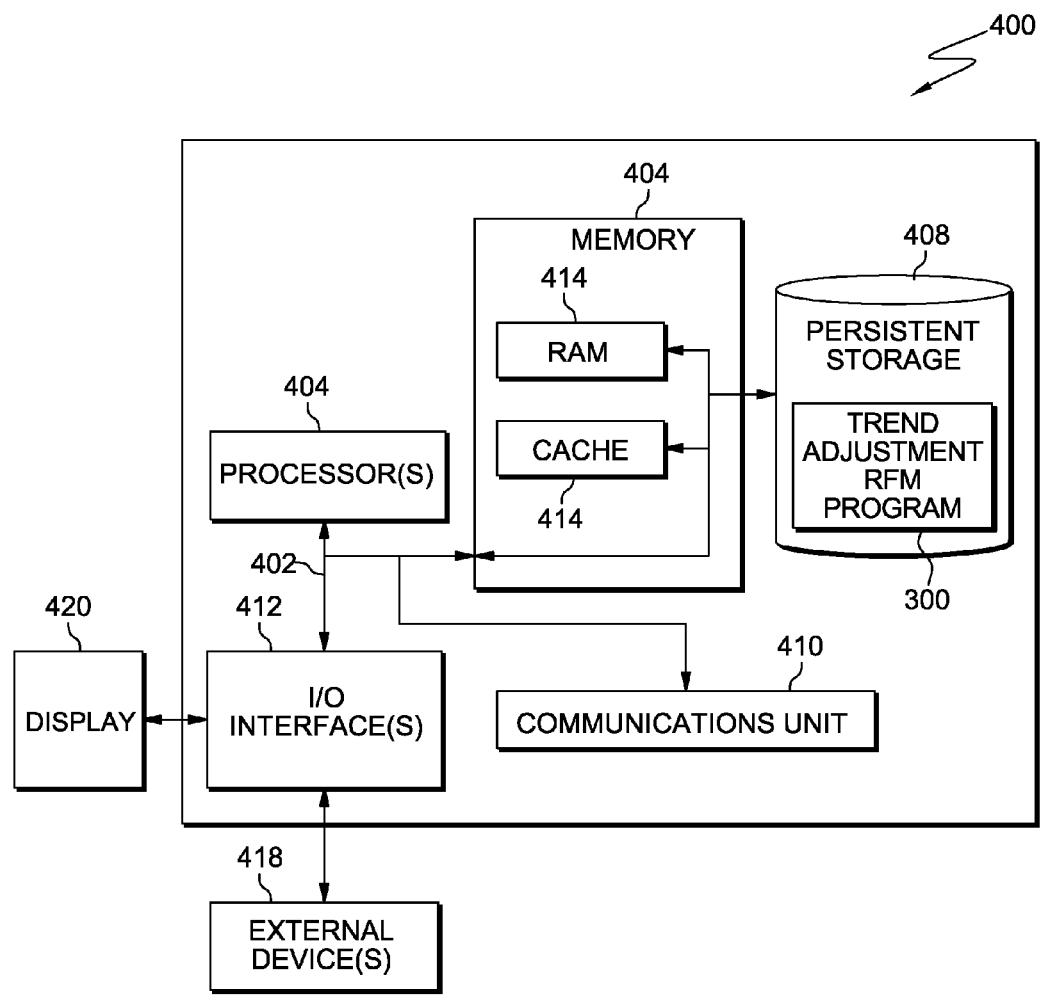
FIG. 4 depicts a block diagram of components of a computing device capable of performing the operational steps of a trend adjusted RFM program, within the distributed data processing environment of FIG. 1, in accordance with an illustrative embodiment of the present invention.

FIG. 4 depicts a block diagram of components of a computing device capable of performing the operational steps of a trend adjusted RFM program, within the distributed data processing environment of FIG. 1, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Trend adjusted RFM program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100, computing device 110, contact transactions 120 and historic data 130. In these examples, communications unit 410 includes one or more network interface cards. Communications unit 410 may provide communications through the use of either or both physical and wireless communications links. Trend adjusted RFM program 300 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., trend adjusted RFM program 300 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for improved sorting of contacts that are grouped together based on a recency, frequency, and monetary value (RFM) score, the computer program product comprising:
   one or more computer-readable storage medium(s) and program instructions stored on the one or more computer-readable storage medium(s), wherein the one or more computer-readable storage medium(s) are not transitory signals per se, the program instructions comprising:
   program instructions to receive and store, transaction information for each contact of a plurality of contacts, wherein the transaction information includes: a timestamp of each transaction of a plurality of transactions of each contact of the plurality of contacts, an identification of each contact of the plurality of contacts, a monetary value of each transaction of the plurality of transactions of each contact of the plurality of contacts, and a quantity of transactions taking place within a pre-determined period of time for each contact of the plurality of contacts;
   program instructions to generate a first set of bins, a second set of bins for each first set of bins, and a third set of bins for each second set of bins, wherein a bin is a data structure configured to receive and store at least some portion of transaction information for each contact of the plurality of contacts;
   program instructions to generate an RFM score for each of the plurality of contacts, wherein a respective RFM score of a contact is based on information of a sequence of consecutive transactions of the plurality of transactions for respective contacts of the plurality of contacts;
   program instructions to sort a first group of contacts of the plurality of contacts to a first bin of the first set of bins, sort a second group of contacts from the first group of contacts to a second bin of the second set of bins, and sort a third group of contacts from the second group of contact to a third bin of the third set of bins, based on the RFM score generated for each respective contact of the plurality of contacts, wherein the RFM scores of contacts sorted to the third group are similar;
   program instructions to generate a trend factor for the contacts of the plurality of contacts sorted to the third set of bins, based on the plurality of transactions of each contact, wherein generation of a trend factor is based on a pattern of the transaction information of the sequence of consecutive transactions of a contact of the plurality of contacts, and wherein the timestamp of each transaction of the plurality of transactions determines the sequence of consecutive transactions, and wherein the trend factor indicates a direction of change in the pattern of the transaction information of the plurality of transactions from a less recent transaction to a most recent transaction;
program instructions to generate an increasing trend factor bin and a decreasing trend factor bin;
program instructions to sort the contacts of the third group that have trend factors indicating an increase within the pattern of transaction information across the sequence of consecutive transactions of the plurality of transactions, respectively, into the increasing trend factor bin;
program instructions to sort the contacts of the third group that have trend factors that indicate a non-increasing pattern of the transaction data across the sequence of consecutive transactions of the plurality of transactions, respectively, into the decreasing trend factor bin; and
program instructions to transmit campaign communications including promotion content, directed to the contacts sorted to the increasing trend factor bin, and campaign communications including retention content, directed to the contacts sorted to the decreasing trend factor bin.

2. The computer program product of claim 1, wherein a trend factor is based on a period of time between the timestamp of a transaction and the timestamp of a previous transaction for each of the plurality of transactions of the contacts of the plurality of contacts, respectively, wherein the period of time for an initial transaction, which is the least recent transaction, of the plurality of transactions for each contact of the plurality of contacts, respectively, is assigned a value of an average of all time periods between transactions from an initial transaction to a most recent transaction for a defined period of time.

3. The computer program product of claim 1, wherein the program instructions to generate a trend factor of the contacts, comprise:
program instructions to determine a transaction and a next previous transaction for each of the plurality of transactions of the contacts, respectively; and
program instructions to generate a time interval weighted mean trend factor as a ratio of:
a summation of a product of a value of a ratio of the monetary value of a transaction and a monetary value of a next previous transaction, and a reciprocal of a duration of time between the transaction and the next previous transaction for each transaction of the plurality of transactions for the contacts, respectively,
and a summation of the reciprocal of the duration of time between the transaction and the next previous transaction for each of the plurality of transactions for the contacts, respectively, wherein the reciprocal of the duration of time for an initial transaction of the plurality of transactions for each of the contacts, respectively, is assigned a value equal to a reciprocal of an average of all time periods between transactions from the initial transaction to a most recent transaction for a defined period of time.

4. The computer program product of claim 1, wherein a trend factor of a first contact of the plurality of contacts is applied to at least one of the recency score, the frequency score, and monetary score that is most relevant, based on results of previous related transaction information.

5. The computer program product of claim 1, further comprising:
in response to a lack of historic transaction information of similar activity, program instructions to apply the trend factor of the contacts, to a median weighted component of differential weights for one of a recency value, a frequency value, and a monetary value of the RFM score of the contacts, of the plurality of contacts.

6. The computer program product of claim 1, wherein a trend factor is one of: a median value and a mode of values of a ratio of the monetary value of a transaction and the monetary value of a next previous transaction, from the plurality of transactions of a contact of the of the plurality of contacts, respectively.

7. The computer program product of claim 1, wherein the mean trend factor of the contacts of the plurality of contacts, are determined, respectively, as a sum of a value of 1 and a best fit calculated slope of a plot of the respective trend factors generated based on transaction information of transactions from a least recent transaction to a most recent transaction of the plurality of transactions for a first contact and the plurality of transactions for a second contact, respectively, for a defined period of time.

8. A computer system for improved sorting of contacts that are grouped together based on a recency, frequency, and monetary value (RFM) score of a transaction, the computer system comprising:
one or more computer processors;
one or more computer-readable storage medium(s);
a database into which is stored transaction information that is received for each contact of a plurality of contacts, the transaction information including: a timestamp of each transaction of a plurality of transactions of each contact of the plurality of contacts, an identification of each contact of the plurality of contacts, a monetary value of each transaction of the plurality of transactions of each contact of the plurality of contacts, and a quantity of transactions taking place within a pre-determined period of time for each contact of the plurality of contacts;
program instructions stored on one of the one or more computer-readable storage medium(s), wherein the one or more computer-readable storage medium(s) are not transitory signals per se, for execution by at least one of the one or more processors, the computer program instructions comprising:
program instructions to generate a first set of bins, a second set of bins for each first set of bins, and a third set of bins for each second set of bins, wherein a bin is a data structure configured to receive and store at least some portion of transaction information for each contact of the plurality of contacts;
program instruction to generate an RFM score for each contact of the plurality of contacts, wherein a respective RFM score of a contact is based on information of a sequence of consecutive transactions of the plurality of transactions for respective contacts of the plurality of contacts;
program instructions to sort a first group of contacts of the plurality of contacts to a first bin of the first set of bins, sort a second group of contacts from the first group of contacts to a second bin of the second set of bins, and sort a third group of contacts from the second group of contact to a third bin of the third set of bins, based on the RFM score generated for each respective contact of the plurality of contacts, wherein the RFM scores of contacts sorted to the third group are similar;

program instructions to generate a trend factor for the contacts of the plurality of contacts sorted to the third set of bins, based on the plurality of transactions of each contact, wherein generation of a trend factor is based on a pattern of the transaction information of the sequence of consecutive transactions of a contact of the plurality of contacts, and wherein the timestamp of each transaction of the plurality of transactions determines the sequence of consecutive transactions, and wherein the trend factor indicates a direction of change in the pattern of the transaction information of the plurality of transactions from a less recent transaction to a most recent transaction;

program instructions to generate an increasing trend factor bin and a decreasing trend factor bin;

program instructions to sort the contacts of the third group that have trend factors indicating an increase in the pattern of the transaction information across the sequence of consecutive transactions of the plurality of transactions, respectively, into the increasing trend factor bin;

program instructions to sort the contacts of the third group that have trend factors that indicate a non-increasing pattern of the transaction information across the sequence of consecutive transactions of the plurality of transactions, respectively, into the decreasing trend factor bin;

program instructions to transmit campaign communications including promotion content, directed to the contacts sorted to the an increasing trend factor bin, and campaign communications including retention content, directed to the contacts sorted to the decreasing trend factor bin.

9. The computer system of claim 8, wherein a trend factor is based on a period of time between the timestamp of a transaction and the timestamp of a previous transaction for each of the plurality of transactions of the contacts of the plurality of contacts, respectively, wherein the period of time for an initial transaction which is the least recent transaction, of the plurality of transactions for each contacts of the plurality of contacts, respectively, is assigned a value of an average of all time periods between transactions from an initial transaction to a most recent transaction for a defined period of time.

10. The computer system of claim 8, wherein the program instructions to determine a trend factor of the contacts of the plurality of contacts, comprises:

program instructions to determine a transaction and a next previous transaction for each of the plurality of transactions of the contacts of the plurality of contacts, respectively; and program instructions to generate a time interval weighted mean trend factor as a ratio of:

a summation of a product of a value of a ratio of the monetary value of a transaction and a monetary value of a next previous transaction, and a reciprocal of a duration of time between the transaction and the next previous transaction for each transaction of the plurality of transactions for the contacts of the plurality of contacts, respectively, and a summation of the reciprocal of the duration of time between the transaction and the next previous transaction for each of the plurality of transactions for the contacts of the plurality of contacts, respectively, wherein the reciprocal of the duration of time for an initial transaction of the plurality of transactions for each of the contacts of the plurality of contacts, respectively, is assigned a value equal to the reciprocal of an average of all time periods between transactions from the initial transaction to a most recent transaction for a defined period of time.

11. The computer system of claim 8, wherein the trend factor is applied to at least one of the recency score, the frequency score, and monetary score that is most relevant, based on results of previous related transaction information.

12. The computer system of claim 8, wherein the trend factor of the contacts of the plurality of contacts, are determined, respectively, as a sum of a value of 1 and a best fit calculated slope of a plot of the respective trend factors generated based on the transaction information of transactions from a least recent transaction to a most recent transaction of the plurality of transactions for the contacts of the plurality of contacts, respectively, for a defined period of time.

13. The computer system of claim 8, wherein the trend factor is one of: a median of trend factors or a mode of trend factors.

14. The computer system of claim 8, further comprising:

in response to a lack of historic transaction information of similar activity, program instructions to apply a trend factor of the contacts of the plurality of contacts, of the plurality of contacts to a median weighted component of differential weights of a recency value, a frequency value, or a monetary value of the RFM score of the contacts of the plurality of contacts.

15. The computer system of claim 8, wherein transaction information of the contacts of the plurality of contacts is collected at a time corresponding to a completion of a transaction as designated by a timestamp of a transaction.

16. A method for improved sorting contacts that are grouped together based on a recency, frequency, and monetary value (RFM) score, the method comprising:

one or more processors receiving and storing transaction information for each contact of a plurality of contacts, wherein the transaction information includes: a timestamp of each transaction of a plurality of transactions of each contact of the plurality of contacts, an identification of each contact of the plurality of contacts, a monetary value of each transaction of the plurality of transactions of each contact of the plurality of contacts, and a quantity of transactions taking place within a pre-determined period of time for each contact of the plurality of contacts;

one or more processors generating a first set of bins, a second set of bins for each first set of bins, and a third set of bins for each second set of bins, wherein a bin is a data structure configured to receive and store at least some portion of transaction information for each contact of the plurality of contacts;

one or more processors generating an RFM score for each of the plurality of contacts, wherein a respective RFM score of a contact is based on information of a sequence of consecutive transactions of the plurality of transactions for respective contacts of the plurality of contacts;

one or more processors sorting a first group of contacts of the plurality of contacts to a first bin of the first set of bins, sorting a second group of contacts from the first group of contacts to a second bin of the second set of bins, and sorting a third group of contacts from the second group of contact to a third bin of the third set of bins, based on the RFM score generated for each respective contact of the plurality of contacts, wherein the RFM scores of contacts sorted to the third group are similar;

one or more processors generating a trend factor for the contacts of the plurality of contacts sorted to the third set of bins, based on the plurality of transactions of each contact, wherein generation of a trend factor is based on a pattern of the transaction information of the sequence of consecutive transactions of a contact of the plurality of contacts, and wherein the timestamp of each transaction of the plurality of transactions determines the sequence of consecutive transactions, and wherein the trend factor indicates a direction of change in the pattern of the transaction information of the plurality of transactions from a less recent transaction to a most recent transaction one or more processors generating an increasing trend factor bin and a decreasing trend factor bin;

one or more processors sorting the contacts of the third group that have a trend factor indicating an increase in the pattern of the transaction information across the sequence of consecutive transactions of the plurality of transactions, respectively, into the increasing trend factor bin;

one or more processors sorting the contacts of the that have a trend factor indicating a non-increase in the pattern of the transaction information, across the sequence of consecutive transactions of the plurality of transactions, respectively, into the decreasing trend factor bin; and one or more processors transmitting campaign communications including promotion content, directed to the contacts sorted to the increasing trend factor bin, and campaign communications including retention content, directed to the contacts sorted to the decreasing trend factor bin.

17. The method of claim 16, wherein a trend factor is based on a period of time between the timestamp of a transaction and the timestamp of a previous transaction for each of the plurality of transactions of the contacts of the set of contacts, respectively, wherein the period of time for an initial transaction which is the least recent transaction, of the plurality of transactions for each contact of the plurality of contacts, respectively, is assigned a value of an average of all time periods between transactions from an initial transaction to a most recent transaction for a defined period of time.

18. The method of claim 16, wherein, determining a trend factor of the contacts of the set of contacts, comprises:

determining, by one or more processors, a transaction and a next previous transaction for each of a plurality of transactions for each contact of the plurality of contacts, respectively; and generating, by one or more processors, a time interval weighted mean trend factor as a ratio of:

a summation of a product of a value of a ratio of the monetary value of a transaction and a monetary value of a next previous transaction, and a reciprocal of a duration of time between the transaction and the next previous transaction for each transaction of the plurality of transactions for each contact of the plurality of contacts, respectively, and a summation of the reciprocal of the duration of time between the transaction and the next previous transaction for each of the plurality of transactions for a first contact and a second contact, respectively, wherein the reciprocal of the duration of time for an initial transaction of the plurality of transactions for each contact of the plurality of contacts, respectively, is assigned a value equal to a reciprocal of an average of all time periods between transactions from the initial transaction to a most recent transaction for a defined period of time.

19. The method of claim 16, wherein the trend factor of the contacts of the plurality of contacts, are applied to at least one of the recency score, the frequency score, and the monetary score that is most relevant, of the contacts of the plurality of contacts, respectively, based on results of previous related transaction information of the contacts of the plurality of contacts, respectively.

20. The method of claim 16, wherein the trend factor of a first contact and the trend factor of a second contact are determined, respectively, as a sum of a value of 1 and a best fit calculated slope of a plot of the respective trend factors generated based on transaction information of transactions from a least recent transaction to a most recent transaction of the plurality of transactions for the first contact and the plurality of transactions for the second contact, respectively, for a defined period of time.

* * * * *